US010684014B2

(12) United States Patent
Quach et al.

(10) Patent No.: US 10,684,014 B2
(45) Date of Patent: Jun. 16, 2020

(54) COMBUSTOR PANEL FOR GAS TURBINE ENGINE

(71) Applicant: Raytheon Technologies Corporation, Farmington, CT (US)

(72) Inventors: San Quach, East Hartford, CT (US); Brian T. Hazel, Avon, CT (US); Kaitlin M. Tomeo, Ellington, CT (US); Robert Selinsky, Jr., Moodus, CT (US); Aaron S. Butler, Colchester, CT (US); John S. Tu, West Hartford, CT (US); William F. Werkheiser, East Hartford, CT (US); Jessica L. Serra, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 412 days.

(21) Appl. No.: 15/228,029

(22) Filed: Aug. 4, 2016

(65) Prior Publication Data
US 2018/0038593 A1 Feb. 8, 2018

(51) Int. Cl.
*F23R 3/00* (2006.01)
*F23R 3/06* (2006.01)
(Continued)

(52) U.S. Cl.
CPC .............. *F23R 3/002* (2013.01); *F02C 3/04* (2013.01); *F02C 7/24* (2013.01); *F23R 3/06* (2013.01); *F05D 2220/32* (2013.01); *F05D 2230/90* (2013.01); *F05D 2240/35* (2013.01); *F05D 2300/10* (2013.01); *F05D 2300/20* (2013.01);
(Continued)

(58) Field of Classification Search
None
See application file for complete search history.

(56) References Cited

U.S. PATENT DOCUMENTS 5,079,915 A * 1/1992 Veau ................. F02K 1/822
60/753
5,419,681 A * 5/1995 Lee ................... F01D 5/186
415/115
(Continued)

FOREIGN PATENT DOCUMENTS

AL 0150656 A1 8/1985
EP 0136071 A1 4/1985
(Continued)

OTHER PUBLICATIONS

European Search Report Issued in EP Application No. 17184794.0; dated Dec. 8, 2017; 9 Pages.

*Primary Examiner* — Todd E Manahan
*Assistant Examiner* — Rodolphe Andre Chabreyrie
(74) *Attorney, Agent, or Firm* — Cantor Colburn LLP

(57) ABSTRACT

A heat shield panel for a gas turbine engine includes a substrate layer having a first substrate surface and a second substrate surface opposite the first substrate surface. The first substrate surface and the second substrate surface define a substrate layer thickness therebetween. One or more thermally protective coating layers are applied to the first substrate surface of the substrate layer. The one or more coating layers have a constant coating layer thickness and the substrate layer thickness tapers along an axial length of the heat shield panel.

18 Claims, 5 Drawing Sheets

(51) Int. Cl.
*F02C 3/04* (2006.01)
*F02C 7/24* (2006.01)

(52) U.S. Cl.
CPC ............ *F05D 2300/611* (2013.01); *F23R 2900/03043* (2013.01)

(56) References Cited

U.S. PATENT DOCUMENTS

| | | | |
|---|---|---|---|
| 5,439,348 A | 8/1995 | Hughes et al. | |
| 9,410,702 B2* | 8/2016 | Dudebout | F23R 3/16 |
| 2002/0124572 A1 | 9/2002 | Pidcock et al. | |
| 2006/0078417 A1* | 4/2006 | Benton | F01D 9/023 |
| | | | 415/115 |
| 2007/0003026 A1* | 1/2007 | Hodge | H04M 3/533 |
| | | | 379/88.1 |
| 2007/0169484 A1* | 7/2007 | Schumacher | F23R 3/002 |
| | | | 60/754 |
| 2007/0271926 A1* | 11/2007 | Alkabie | F23R 3/06 |
| | | | 60/772 |
| 2010/0011775 A1* | 1/2010 | Garry | C23C 4/02 |
| | | | 60/752 |
| 2012/0073303 A1* | 3/2012 | McCarren | F23M 5/02 |
| | | | 60/752 |

FOREIGN PATENT DOCUMENTS

| | | |
|---|---|---|
| EP | 1104872 | 6/2001 |
| EP | 1515090 A1 | 3/2005 |
| EP | 3032175 A1 | 6/2016 |
| GB | 2368902 A | 5/2002 |
| GB | 2441342 A | 3/2008 |
| WO | 2015036430 A1 | 3/2015 |
| WO | 2016099805 A2 | 6/2016 |

* cited by examiner

COMBUSTOR PANEL FOR GAS TURBINE ENGINE

BACKGROUND

This disclosure relates to gas turbine engines, and more particularly to combustor panels for a combustor of a gas turbine engine.

A gas turbine engine typically includes a compressor which compresses and directs an airflow to a combustor. At the combustor, the airflow is mixed with fuel and ignited. Post-combustor, the airflow is utilized to drive a turbine.

Combustors utilize panels offset from a combustor shell to define cooling pathways to protect itself from the heat of combustion. Current combustor panels typical overlap with each other to define a slot through which an airflow can be directed for film cooling of downstream panels. The panels are coated with a thermally-protective material which may have a tapered thickness at the ends of the combustor panels to maintain proper assembly fits and clearances, as well as to maintain a desired flow area through the slot.

Emerging coating systems have advanced microstructure, and cannot be tapered without risk of chipping, spalling, reduced oxidation resistance capability or other negative effects. At the same time, the taper is needed to maintain the assembly fits and clearances and flow area.

SUMMARY

In one embodiment, a heat shield panel for a gas turbine engine includes a substrate layer having a first substrate surface and a second substrate surface opposite the first substrate surface. The first substrate surface and the second substrate surface define a substrate layer thickness therebetween. One or more thermally protective coating layers are applied to the first substrate surface of the substrate layer. The one or more coating layers have a constant coating layer thickness and the substrate layer thickness tapers along an axial length of the heat shield panel.

Additionally or alternatively, in this or other embodiments the substrate layer thickness tapers along a taper length equal to up to 50 percent of a heat shield panel length.

Additionally or alternatively, in this or other embodiments the taper length is between 10 percent and 40 percent of the heat shield panel length.

Additionally or alternatively, in this or other embodiments a taper angle between the first substrate surface and the second substrate surface is up to sixty degrees.

Additionally or alternatively, in this or other embodiments the substrate layer is formed from a metallic material.

Additionally or alternatively, in this or other embodiments the at least one coating layer of the one or more coating layers are formed from a ceramic material.

Additionally or alternatively, in this or other embodiments a plurality of heat dissipation features extend from the second substrate surface.

Additionally or alternatively, in this or other embodiments the plurality of heat dissipation features include one or more of pins or fins.

In another embodiment, a combustor for a gas turbine engine includes a combustor shell and a plurality of heat shield panels secured to the combustor shell. The heat shield panels include a substrate layer having a first substrate surface and a second substrate surface opposite the first substrate surface. The first substrate surface and the second substrate surface define a substrate layer thickness therebetween. One or more thermally protective coating layers are applied to the first substrate surface of the substrate layer. The one or more coating layers have a constant coating layer thickness and the substrate layer thickness tapers along an axial length of the heat shield panel.

Additionally or alternatively, in this or other embodiments a first heat shield panel of the plurality of heat shield panels is tapered at an overlap to a second heat shield panel of the plurality of heat shield panels.

Additionally or alternatively, in this or other embodiments the overlap defines a flow passage for a cooling airflow.

Additionally or alternatively, in this or other embodiments the substrate layer thickness tapers along a taper length equal to up to 50 percent of a heat shield panel length.

Additionally or alternatively, in this or other embodiments the taper length is between 10 percent and 40 percent of the heat shield panel length.

Additionally or alternatively, in this or other embodiments a taper angle between the first substrate surface and the second substrate surface is up to sixty degrees.

Additionally or alternatively, in this or other embodiments the substrate layer is formed from a metallic material.

Additionally or alternatively, in this or other embodiments at least one coating layer of the one or more coating layers are formed from a ceramic material.

Additionally or alternatively, in this or other embodiments a plurality of heat dissipation features extend from the second substrate surface.

Additionally or alternatively, in this or other embodiments the plurality of heat dissipation features include one or more of pins or fins.

In yet another embodiment, a gas turbine engine includes a turbine and a combustor operably connected to the turbine. The combustor includes a combustor shell and a plurality of heat shield panels secured to the combustor shell. The heat shield panels have a substrate layer with a first substrate surface and a second substrate surface opposite the first substrate surface. The first substrate surface and the second substrate surface define a substrate layer thickness therebetween. One or more thermally protective coating layers are applied to the first substrate surface of the substrate layer. The one or more coating layers have a constant coating layer thickness and the substrate layer thickness tapers along an axial length of the heat shield panel.

Additionally or alternatively, in this or other embodiments a first heat shield panel of the plurality of heat shield panels is tapered at an overlap to a second heat shield panel of the plurality of heat shield panels.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
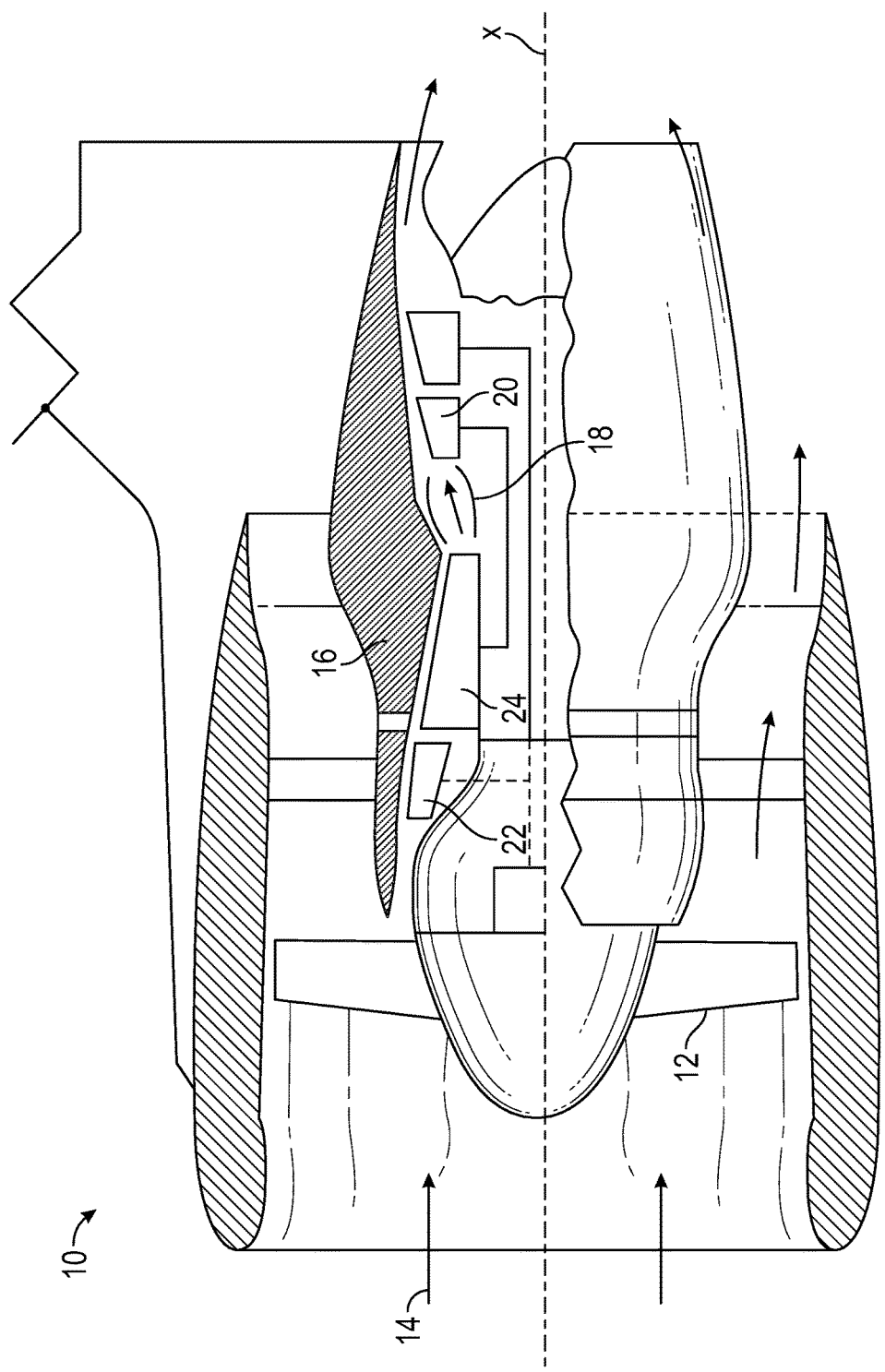
FIG. 1 is a schematic illustration of a gas turbine engine.

FIG. 1 is a schematic illustration of a gas turbine engine 10. The gas turbine engine generally has a fan 12 through which ambient air is propelled in the direction of arrow 14, a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis X of the gas turbine engine 10.

The gas turbine engine 10 may further comprise a low pressure compressor 22 located upstream of a high pressure compressor 24 and a high pressure turbine located upstream of a low pressure turbine. For example, the compressor 16 may be a multi-stage compressor 16 that has a low-pressure compressor 22 and a high-pressure compressor 24 and the turbine 20 may be a multistage turbine 20 that has a high-pressure turbine and a low-pressure turbine. In one embodiment, the low-pressure compressor 22 is connected to the low-pressure turbine and the high pressure compressor 24 is connected to the high-pressure turbine.

Figure 2:
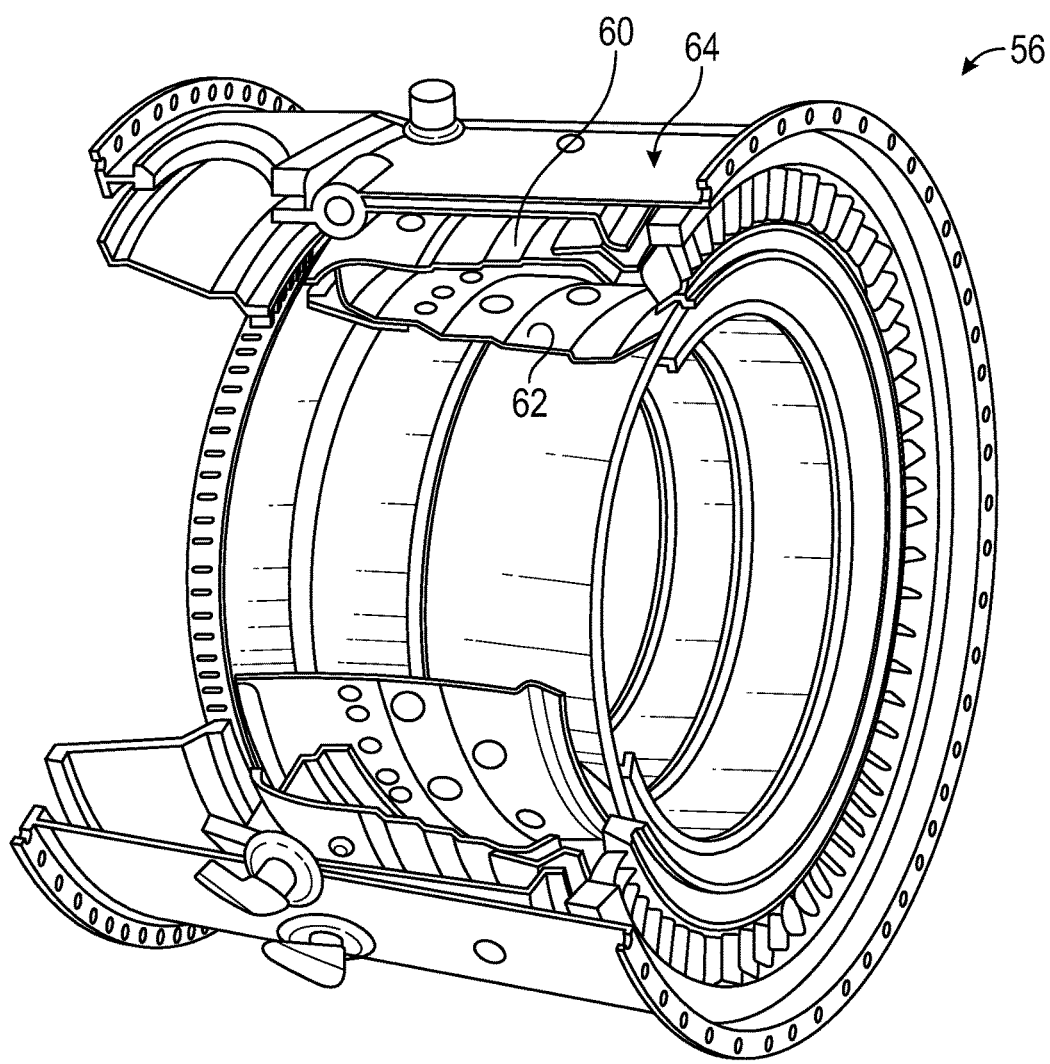
FIG. 2 is a partial cross-sectional illustration of an embodiment of a combustor portion of a gas turbine engine.

With reference to FIG. 2, the combustor 18 generally includes an outer shell 60 and an inner shell 62 within a combustor case 64. It should be understood that various combustor arrangements may alternatively be provided and benefit herefrom.

Figure 3:
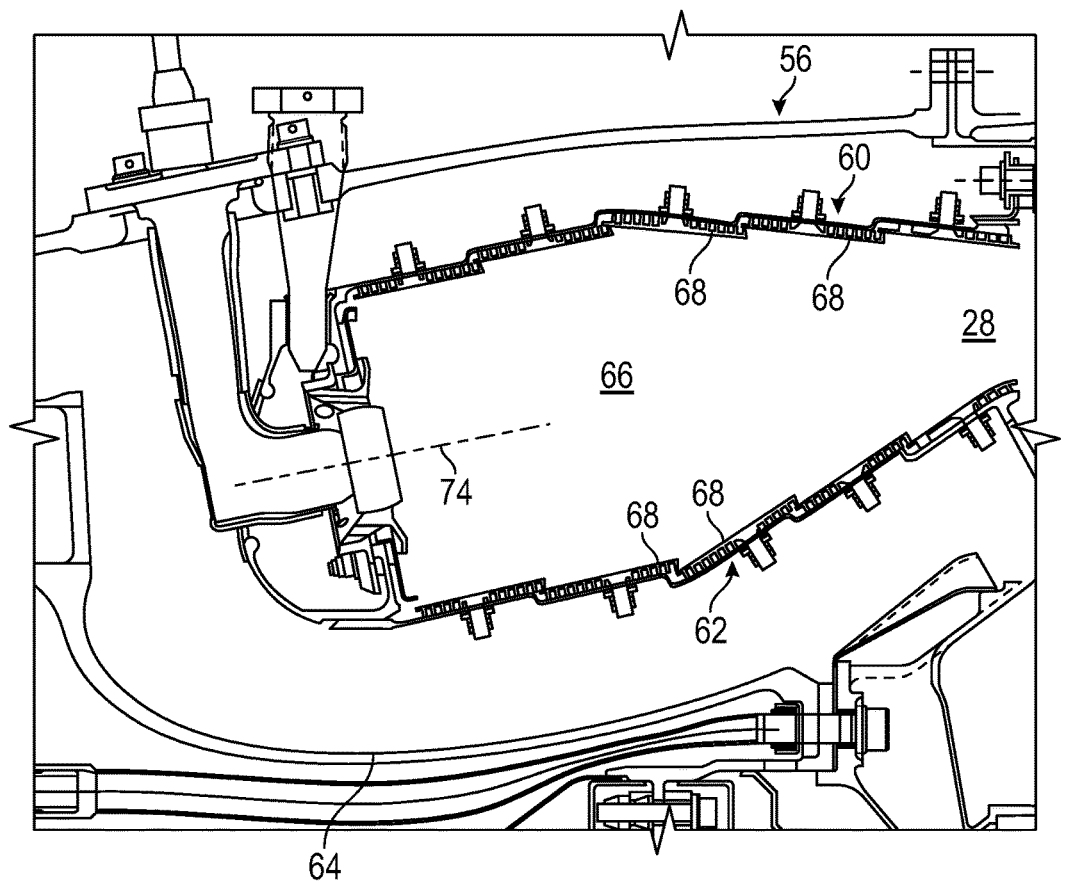
FIG. 3 is a cross-sectional view of an embodiment of a combustor of a gas turbine engine.

With reference to FIG. 3, the outer shell 60 and the inner shell 62 define a combustion chamber 66 between shells 60, 62. Outer and inner shells 60, 62 extend toward the turbine section 20. A multiple of heat shield panels 68 line the hot side of the outer shell 60 and the inner shell 62. It is to be appreciated that the term "hot side" refers to a surface substantially facing a combustion chamber axis 74, as opposed to "cold side", which refers to a surface substantially facing away from the combustion chamber axis 74. Fastener assemblies F such as studs and nuts may be used to connect each of the heat shield panels 68 to the respective inner and outer shells 60, 62. The heat shield panels 68 define an array which may be generally annular in shape and extend toward the turbine section 28. Impingement cooling holes (not shown) penetrate through the inner and outer support shells 60, 62 to communicate coolant, such as secondary cooling air, into the space between the inner and outer support shells 60, 62 and the heat shield panels 68.

Figure 4:
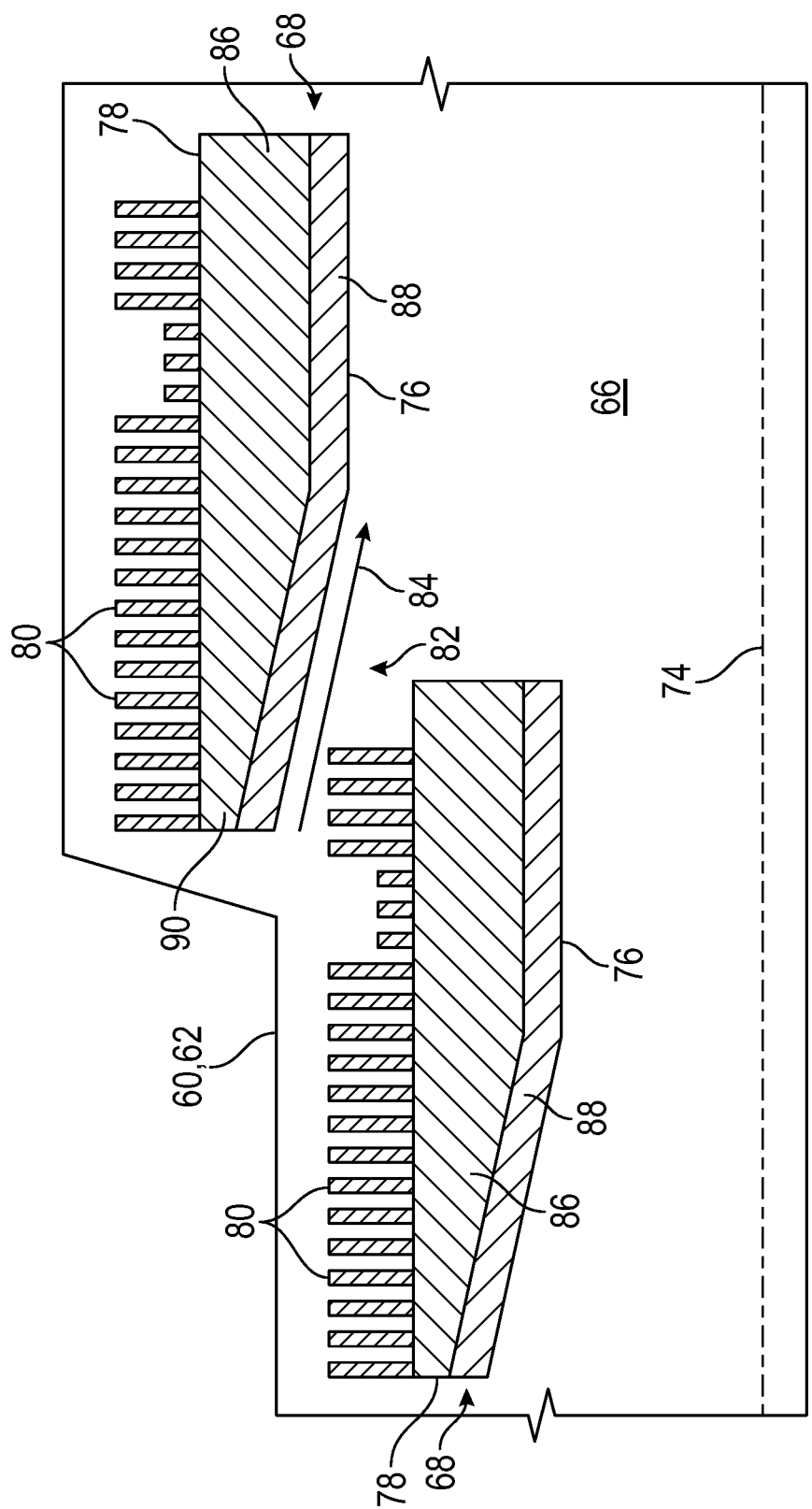
FIG. 4 is a cross-sectional view of an embodiment of a heat shield panel arrangement for a combustor.

With reference to FIG. 4, the heat shield panels 68 each include a first panel surface 76 substantially facing the combustion chamber axis 74 and a second panel surface 78 opposite the first panel surface 76 and substantially facing the respective inner or outer shell 60, 62 to which it is secured. The heat shield panels 68 further include heat dissipation features 80, such as pins and/or fins extending from the second panel surface 78 to dissipate thermal energy from the heat shield panels 68 via the secondary cooling air flowing between the heat shield panels 68 and the inner and outer shells 60, 62. In addition to such convective cooling of the heat shield panels 68, film cooling is utilized to thermally protect the heat shield panels 68 from the heat of the combustion chamber 66. To achieve the film cooling, the heat shield panels 68 are shingled or overlapped defining a flow passage 82 between adjacent heat shield panels 68. A portion of the secondary cooling flow 84 passes through the flow passage 82 and along the first panel surface 76 to define a cooling film along a downstream panel surface 76.

The heat shield panels 68 include a substrate layer 86 manufactured of, for example, a nickel based superalloy. The heat shield panels 68 further include a coating layer 88 that defines the first panel surface 76 of the heat shield panel 68. The coating layer 88 a thermally protective layer which in some embodiments is formed from, for example, a ceramic material. Such coatings have advanced microstructure, so it is desired to apply the coating layer 88 as a constant thickness layer to the substrate layer 86. In some embodiments, coating layer 88 may comprise a plurality of coating layers 88, each with a constant thickness.

Figure 5:
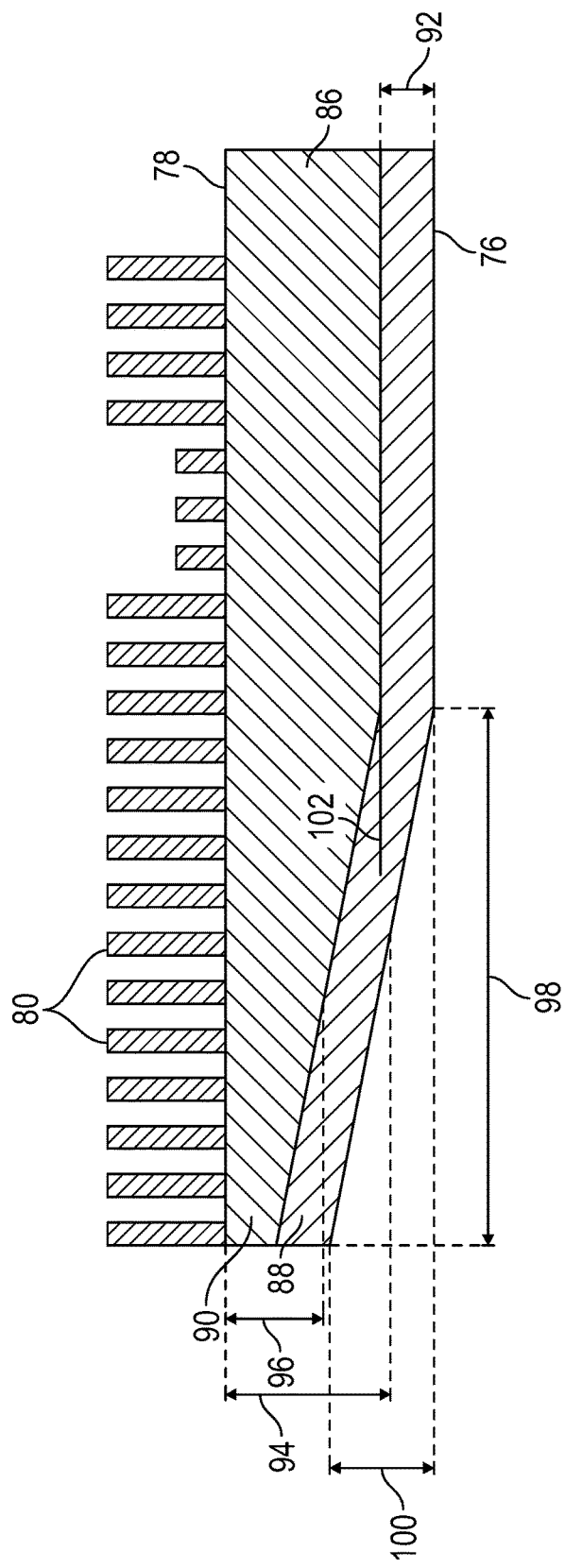
FIG. 5 is a cross-sectional view of an embodiment of a heat shield panel for a combustor.

Referring now to FIG. 5, is it also desired that the heat shield panel 68 (including both the substrate layer 86 and the coating layer 88) has a tapered thickness, at least at an overlap portion 90 (shown best in FIG. 4), where the heat shield panel 68 overlaps an adjacent heat shield panel 68. The tapered thickness is utilized to maintain assembly fits and clearances between the adjacent heat shield panels 68 and to ensure the flow passage 82 cross-sectional area is maintained within a selected range. With the coating layer 88 having a constant thickness 92, the tapered heat shield panel thickness 94 is achieved by tapering a substrate layer thickness 96. The substrate layer thickness 96 is defined by a taper length 98 a taper depth 100 and/or a taper angle 102. In some embodiments, the taper length 98 is up to 50% of a panel length 104 of the heat shield panel 68. Further, in other embodiments, the taper length 98 is between 10% and 40% of the panel length 104. The taper angle 102 is up to about 60 degrees.

Tapering of the substrate layer 86 as in the present disclosure defines a taper of the heat shield panel 68 to maintain proper assembly fits and clearances, as well as to maintain a desired flow area through the flow passage 82. It further allows the coating layer 88 to be applied at a constant thickness, without taper, to reduce risk of chipping, spalling, reduced oxidation resistance capability or other negative effects to the coating layer 88 and/or the substrate layer 86.

While the heat shield panels 68 are applied herein to the combustor 56, one skilled in the art will readily appreciate that the present disclosure may be applied overlapping panels utilized in other portions of the gas turbine engine 10, for example, an augmenter or exit nozzle portion of the gas turbine engine 10 where panels may be utilized to thermally insulate components as well as reduce observable signature of the components.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A heat shield panel assembly for a gas turbine engine, comprising a first heat shield panel and a second heat shield panel, each of the first heat shield panel and the second heat shield panel including:
 a substrate layer including:
  a first substrate surface; and
  a second substrate surface opposite the first substrate surface, the first substrate surface and the second substrate surface defining a substrate layer thickness therebetween; and
 one or more thermally protective coating layers applied to the first substrate surface of the substrate layer;
 wherein the substrate layer thickness decreases to a tapered thickness at an upstream end of the heat shield panel over a taper length;
 wherein the one or more coating layers have a constant coating layer thickness along the taper length; and
 wherein the first heat shield panel is tapered at an overlap to the second heat shield panel.

2. The heat shield panel of claim 1, wherein the taper length is equal to up to 50 percent of a heat shield panel length.

3. The heat shield panel of claim 2, wherein the taper length is between 10 percent and 40 percent of the heat shield panel length.

4. The heat shield panel of claim 1, wherein a taper angle between the first substrate surface and the second substrate surface is up to sixty degrees.

5. The heat shield panel of claim 1, wherein the substrate layer is formed from a metallic material.

6. The heat shield panel of claim 1, wherein at least one coating layer of the one or more coating layers is formed from a ceramic material.

7. The heat shield panel of claim 1, further comprising a plurality of heat dissipation features extending from the second substrate surface.

8. The heat shield panel of claim 7, wherein the plurality of heat dissipation features include one or more of pins or fins.

9. A combustor for a gas turbine engine, comprising:
 a combustor shell; and
 a plurality of heat shield panels secured to the combustor shell, the heat shield panels including:
  a substrate layer including:
   a first substrate surface; and
   a second substrate surface opposite the first substrate surface, the first substrate surface and the second substrate surface defining a substrate layer thickness therebetween; and
  one or more thermally protective coating layers applied to the first substrate surface of the substrate layer;
 wherein the substrate layer thickness decreases to a tapered thickness at an upstream end of the heat shield panel over a taper length;
 wherein the one or more coating layers have a constant coating layer thickness along the taper length; and
 wherein a first heat shield panel of the plurality of heat shield panels is tapered at an overlap to a second heat shield panel of the plurality of heat shield panels.

10. The combustor of claim 9, wherein the overlap defines a flow passage for a cooling airflow.

11. The combustor of claim 9, wherein the taper length equals to up to 50 percent of a heat shield panel length.

12. The combustor of claim 11, wherein the taper length is between 10 percent and 40 percent of the heat shield panel length.

13. The combustor of claim 9, wherein a taper angle between the first substrate surface and the second substrate surface is up to sixty degrees.

14. The combustor of claim 9, wherein the substrate layer is formed from a metallic material.

15. The combustor of claim 9, wherein at least one coating layer of the one or more coating layers is formed from a ceramic material.

16. The combustor of claim 9, further comprising a plurality of heat dissipation features extending from the second substrate surface.

17. The combustor of claim 16, wherein the plurality of heat dissipation features include one or more of pins or fins.

18. A gas turbine engine, comprising:
 a turbine; and
 a combustor operably connected to the turbine, the combustor including:
  a combustor shell; and
  a plurality of heat shield panels secured to the combustor shell, the heat shield panels including:
   a substrate layer including:
    a first substrate surface; and
    a second substrate surface opposite the first substrate surface, the first substrate surface and the second substrate surface defining a substrate layer thickness therebetween; and
   one or more thermally protective coating layers applied to the first substrate surface of the substrate layer;
  wherein the substrate layer thickness decreases to a tapered thickness at an upstream end of the heat shield panel over a taper length;
  wherein the one or more coating layers have a constant coating layer thickness along the taper length; and
  wherein a first heat shield panel of the plurality of heat shield panels is tapered at an overlap to a second heat shield panel of the plurality of heat shield panels.

* * * * *